(12) United States Patent
Karau et al.

(10) Patent No.: US 6,472,571 B1
(45) Date of Patent: Oct. 29, 2002

(54) PROCESS FOR THE PRODUCTION OF ORGANIC COMPOUNDS IN A MEMBRANE REACTOR

(75) Inventors: Andreas Karau, Herzogenrath; Jens Wöltinger, Hanau; Olaf Burkhardt, Kalmhout; Andreas Bommarius, Frankfurt am Main; Kai Boldt, Hanau; Jean-Louis Philippe, Dreieich; Hans Henniges, Bonn; Karlheinz Drauz, Freigericht, all of (DE)

(73) Assignee: Degussa-Huls AG, Frankfurt am Main (DE)

( * ) Notice: Subject to any disclaimer, the term of this patent is extended or adjusted under 35 U.S.C. 154(b) by 0 days.

(21) Appl. No.: 09/676,975

(22) Filed: Oct. 2, 2000

(30) Foreign Application Priority Data

Oct. 1, 1999 (DE) .......................................... 199 47 505

(51) Int. Cl.$^7$ ..................... C07C 27/00; C07C 33/28
(52) U.S. Cl. ....................... 568/814; 568/813
(58) Field of Search ................. 422/211, 213, 422/255, 261, 139, 140, 149; 568/813, 814

(56) References Cited

U.S. PATENT DOCUMENTS 6,180,837 B1 * 1/2001 Giffels et al. ............... 568/814

FOREIGN PATENT DOCUMENTS

| EP | 0 425 252 A1 | * | 5/1991 |
| EP | 0 442 122 | | 8/1991 |
| WO | WO/9822415 | * | 5/1998 |

OTHER PUBLICATIONS

Cabral et al., "Biotransformation in organic media by enzymes and whole cells", Journal of Biotechnology 59 (1997) pp. 133–143.

Felder et al., "A polymer-enlarged homogeneously soluble oxazaborolidine catalyst for the asymmetric reduction of ketones by borane", Tetrahedron: Asymmetry, vol. 8, No. 12, pp. 1975–1977, 1997.

* cited by examiner

*Primary Examiner*—Samuel Barts
*Assistant Examiner*—Elvis O. Price
(74) *Attorney, Agent, or Firm*—Pillsbury Winthrop LLP

(57) ABSTRACT

Process for the production of organic compounds in a membrane reactor. Inorganic membranes composed of an inorganic backing layer and an inorganic interlayer are used in the membrane reactor. The inorganic interlayer may be modified with organic groups.

17 Claims, 1 Drawing Sheet

PROCESS FOR THE PRODUCTION OF ORGANIC COMPOUNDS IN A MEMBRANE REACTOR

CROSS-REFERENCE TO RELATED APPLICATION

This application is related to German Application DE 199 47 505.9, filed Oct. 1, 1999, which disclosure is incorporated herein by reference.

FIELD OF THE INVENTION

The present invention concerns a process for the catalytic production of organic compounds. In particular the process operates in membrane reactors equipped with inorganic membranes.

BACKGROUND OF THE INVENTION

Catalytic processes are characterized in that the catalyst involved in the reaction is not consumed or is consumed only in small quantities. Even in a batch process a catalyst could, in ideal circumstances, be used for the reaction under consideration for an infinitely long period if losses during recycling or inactivation did not reduce the catalyst performance over time. Restricting the loss of catalyst can therefore contribute to minimizing process costs in catalytic synthesis performed on an industrial scale.

A continuous process, whereby the catalyst is immobilized in a reaction vessel while only the reactants can be added and only the products removed, is preferred to standard catalyst recycling, however. This processing mode can be put into practice in membrane reactors by the use of catalysts having increased molecular weight (Wandrey et al. in Jahrbuch 1998, Verfahrenstechnik und Chemieingenieurwesen, VDI p. 151ff.; Wandrey et al. in Applied Homogeneous Catalysis with Organometallic Compounds, Vol. 2, VCH 1996, p.832 ff.; Kragl et al., Angew. Chem. 1996, 6, 684f.).

Reports on catalysts having increased molecular weight or increased polymer have already appeared in the prior art on a number of occasions (Reetz et al., Angew. Chem. 1997, 109, 1559f.; Seebach et al., Helv. Chim Acta 1996, 79,1710 f.; Kragl et al., Angew. Chem. 1996, 108, 684f.; Schurig et al., Chem. Ber./Recueil 1997,130, 879f.; Bolm et al., Angew. Chem. 1997, 109, 773f.; Bolm et al. Eur. J. Org. Chem. 1998, 21f.; Baystone et al. in Speciality Chemicals 224f.; Salvadori et al., Tetrahedron: Asymmetry 1998, 9, 479; Wandrey et al., Tetrahedron: Asymmetry 1997, 8, 1529f.; ibid. 1997, 8, 975f.; Togni et al. J. Am. Chem. Soc. 1998, 120, 10274f., Salvadori et al., Tetrahedron Left. 1996, 37, 3375f.)

Until now exclusively polymeric membranes of organic origin have been used in processes in which homogeneously or colloidally soluble catalysts having increased molecular weight were used in membrane reactors.

The use of polymeric membranes is associated with a number of disadvantages, however, because of the organic solvents used in chemical synthesis.

The solvent resistance of the polymeric membranes that are commercially available at present applies in each case only to selected solvents. Different membranes therefore have to be used in production, depending on the reaction and solvent. In practice this means that the membranes have to be changed between different production batches. Moreover, when changing between polar and non-polar solvents, various membrane conditioning steps have to be interposed (Schmidt et al.; Chemie Ingenieur Technik (71), 3/1999).

Furthermore, the temperature resistance of the polymeric membranes that are commercially available at present is restricted to a maximum of 80° C. Information available in the literature or supplied by the manufacturer fluctuates between 40° and 80° C. for solvent-stable polymeric membranes. In homogeneous catalysis in particular, however, it may also be necessary to operate at temperatures above 70° C., since the degree of conversion can thereby be improved ("Metal-cat. Cross-coupling Reactions", Ed.: F. Diedrich, P. J. Stang, VCH-Wiley, 1998

"Transition Metals for Org. Synthesis", Ed.: M. Beller, C. Bolm, VCH-Wiley, 1998).

The flow rates for the currently available polymeric membranes in the area of ultrafiltration and especially nanofiltration are very low for industrial use. The flow rates that can be achieved depend on the solvent and membrane used, but are generally well below 5 $l/m^2/h/bar$ (Schmidt et al.; Chemie IngenieurTechnik (71), 3/1999).

The polymeric membranes display poor mechanical stability in regard to pressure. The use of these membranes at elevated pressures is technically achievable only by incorporating them in specially made and hence expensive flat or filament-wound modules with appropriate module housings.

SUMMARY OF THE INVENTION

The object of the present invention was therefore to provide a process whereby the problems in terms of solvent dependence, sensitivity to pressure, poor flow rate or reduced temperature resistance of the membranes as referred to above do not arise, such that their use in the manufacture of organic compounds on an industrial scale appears to be possible without reservation and to be advantageous in economic terms.

This object is achieved both economically and effectively in a process for the production of organic compounds in a membrane reactor with the aid of homogeneously or colloidally soluble catalysts having increased molecular weight, by using as membrane an inorganic membrane that displays an inorganic backing layer and an inorganic interlayer, whereby the interlayer can be modified with organic groups.

In principle the use of inorganic membranes for the retention and separation of heterogeneous catalysts is documented by various processes (e.g. DE 197 27 715 A1), but such membranes have so far not been proposed for the separation of homogeneously or colloidally soluble catalysts having increased molecular weight.

One reason for this is that unlike heterogeneous catalysts, the retention ability of homogeneously or colloidally soluble catalysts having increased molecular weight is not linked in a straight-forward manner to the molecule size. Instead the retention ability is determined by what is known as the hydrodynamic molecule diameter, which is governed by various parameters (molecular structure, solvent, etc.). However, the importance of an extremely high retention ability in a catalyst behind a membrane relative to the loss of catalyst due to bleeding is illustrated in FIG. 1 by means of simple theoretical estimates. Only when the retention is well above >99.9% are the catalysts retained in the reactor to a sufficient degree and for residence times that are of any interest for industrial applications.

While polymeric membranes have enabled appropriate residence times to be achieved for some time now as a result of extremely favorable cut-offs, in the case of inorganic membranes this has only been technically feasible for a relatively short time.

Another effect likewise discouraged the use of inorganic membranes. The retention ability in the dead-end mode of operation is lower in comparison to that of polymeric membranes with a comparable cut-off.

TABLE 1

Example polymer: polystyrene in THF

| Membrane | Polymer size [Da] | Retention % |
|---|---|---|
| Polymer-based nanofiltration membrane (nominal cut-off 700 Da) | 70000 | 99.96 |
| Ceramic nanofiltration membrane ($d_{p50}$ < 0.9 nm) | 100000 | 99.61 |

Surprisingly it has been found that in the crossflow mode of operation, by contrast, a crossflow-dependent retention ability develops to such an extent that it can compensate for or even overcompensate for this disadvantage, even at relatively low crossflow speeds (see Table 2 and Example 1).

This was extremely surprising, yet no less advantageous as a consequence.

TABLE 2

Retention ability and crossflow speeds at an inorganic membrane in a three-channel membrane module ($dp_{50}$ < 0.9 nm) for a polystyrene polymer in THF as a function of the average molecular weight.

| Ceramic membrane ($dp_{50}$ < 0.9 nm) | Crossflow speed | |
|---|---|---|
| Molecular weight of polymer [Da] | 0.5 m/s | 2 m/s |
| 4000 | Retention 96.72% | 97.60% |
| 47500 | Retention 99.82% | 99.96% |
| 280000 | Retention > 99.98% | >99.98% |

In principle all inorganic membranes familiar to the person skilled in the art that display an inorganic backing layer and an inorganic interlayer can be used as membranes. The interlayer forms the actual small pore diameter required for retention, whereby this can be modified using organic groups known to the person skilled in the art in order to modify its separation properties (e.g. hydrophobia and hydrophilia).

Examples of such components include silicon-organic compounds in general, particularly alkyl silanes (Noach et. al., Chemie lngenieur Technik (70) 8/98). Furthermore there are suitable organic compounds with which the interlayer can be modified, including $(CH_3)_3SiCl$, methyltriethoxysilane, ethyltriethoxysilane, octyltriethoxysilane, octadecyltriethoxysilane, mono- or polyfluoroalkylethoxysilane or also silanes with functionalized organic groups that permit a subsequent further modification by means of covalent linkage knotting by known means. Examples of these include trimethoxyvinylsilane, $H_2C=C(CH_3)CO_2(CH_2)_3Si(OCH_3)_3$, triethoxyvinylsilane and 3-glycidoxypropyl trimethoxysilane, as well as silanes with hydroxyl, carboxyl, epoxy and carboxylic acid ester groups carrying inorganic radicals. In a particular embodiment the filler is modified with silanes having the general formula $RSi(OX)_3$, where R is an alkyl group with 1 to 18 C atoms and X is an alkyl group with 1 or 2 C atoms. Trimethyl chlorosilane is particularly used to increase stability and hydrophobicity, as described in Koyano, K. A.; Tatsumi, T.; Tanaka, Y.; Nakata, S. J. Phys. Chem. B 1997, 101, p. 9436 und Zhao, X. S.; Lu, G. Q., J. Phys. Chem. B 1998, 102, p. 1156.

The average pore diameter in the inorganic separation membrane should be dimensioned such that an economically meaningful product flow is ensured with as high a retention ability as possible. The pore diameter should preferably be greater than 0.1 nm, particularly preferably greater than 0.4 nm. The interlayer used should exhibit an upper average pore diameter of less than 200 nm, particularly preferably less than 10 nm, most particularly preferably less than 1 nm.

As has already been indicated, advantageous membranes are those exhibiting a structure wherein the backing layer of the membrane consists of one or more inorganic oxides, preferably aluminium oxide and/or $SiO_2$. One or more interlayers consisting of one or more inorganic oxides, preferably titanium oxide, $SiO_2$, $Al_2O_3$ and/or zirconium oxide, can moreover be applied to this backing layer. As indicated above, it can be advantageous to modify the interlayer additionally with organic components.

As has further been mentioned above, the membrane can be used in a dead-end filtration process. The embodiment whereby the membrane is used in crossflow mode as a mono- or multitubular module or in the form of a flat membrane as a plate module with tangential crossflow in a crossflow filtration module appears to be advantageous according to the invention. The crossflow speeds in this context should range within the industrial and economic limits. Linear crossflow speeds of 0.01–5 m/s are preferred, particularly preferably 0.05–2 m/s. The process can be performed in a temperature range from 10° to 250° C. and at a transmembrane pressure of max. 150 bar, preferably up to 10 bar, particularly preferably up to 50 bar.

Catalysts having increased molecular weight made from a dendritic, linear or variously branched homopolymer or copolymer consisting of butadiene and/or isoprene or a copolymer consisting of butadiene and/or isoprene optionally with propylene and/or styrene or a block copolymer consisting of polybutadiene and/or polyisoprene optionally with polypropylene and/or polystyrene as polymer framework or linear, branched and dendritic polymers consisting of polysiloxanes, polyacrylates, polyvinyl pyrrolidones and polystyrenes are advantageous.

The catalysts having increased molecular weight can preferably exhibit as active center a catalyst selected from the group of oxazaborolidines, TADDOLs, salens, quinidines, oxazolines, amino alcohols, diols, mono- and diphosphanes, -phosphites, -phosphonites, or phosphinites.

The process according to the invention can be used to produce non-chiral, racemic and enantiomer-enriched organic compounds.

In addition to the previously described advantages in the use of homogeneously or colloidally soluble catalysts having increased molecular weight in polymeric membranes, further advantages of this process include a pronounced expansion of the possible operating parameters in regard to pressure, temperature and solvent spectrum when a membrane is used. At the same time the specific filtrate flows of inorganic membranes are significantly higher in comparison to polymeric membranes with the same nominal cut-off and corresponding crossflow speed (Example 1).

It has been found that by making an optimum selection of operating conditions, matching the molecular weight and the type of polymer to the average pore diameter of the membrane, extreme retention capacities in the catalysts can be achieved that enable these catalysts to be used advantageously on an industrial basis.

In the context of the invention, the term membrane reactor refers to any type of reaction vessel whereby the catalyst is enclosed in a reactor while low-molecular substances are fed into the reactor or are able to leave it. The membrane can be integrated directly into the reaction chamber or incorporated into a separate filtration module outside, whereby the reaction solution flows continuously or intermittently through the filtration module and the retained matter is returned to the reactor. Suitable embodiments are described inter alia in WO98/22415 and in Wandrey et al. in Jahrbuch 1998, Verfahrenstechnik und Chemieingenieurwesen, VDI p. 151ff.; Wandrey et al. in Applied Homogeneous Catalysis with Organometallic Compounds, Vol. 2, VCH 1996, p.832 ff.; Kragl et al., Angew. Chem. 1996, 6, 684f.

Homogeneous or colloidal solubility refers to a solution in which phase separation does not occur under the influence of gravity or of a centrifugal force of equivalent strength to gravity.

In the context of the invention the term increased molecular weight refers to the increase in molecular weight of the catalyst under consideration by means of adsorptive or covalent bonding to appropriate organic or inorganic homogeneously or colloidally soluble support materials, e.g. nanoparticles (Zhao et al. Angew. Chem. 1999, 111, No.3).

The term enantiomer-enriched refers to the predominance of one optical antipode in a mixture of both optical antipodes.

DETAILED DESCRIPTION OF THE PREFERRED EMBODIMENTS

EXAMPLES

Figure 1:
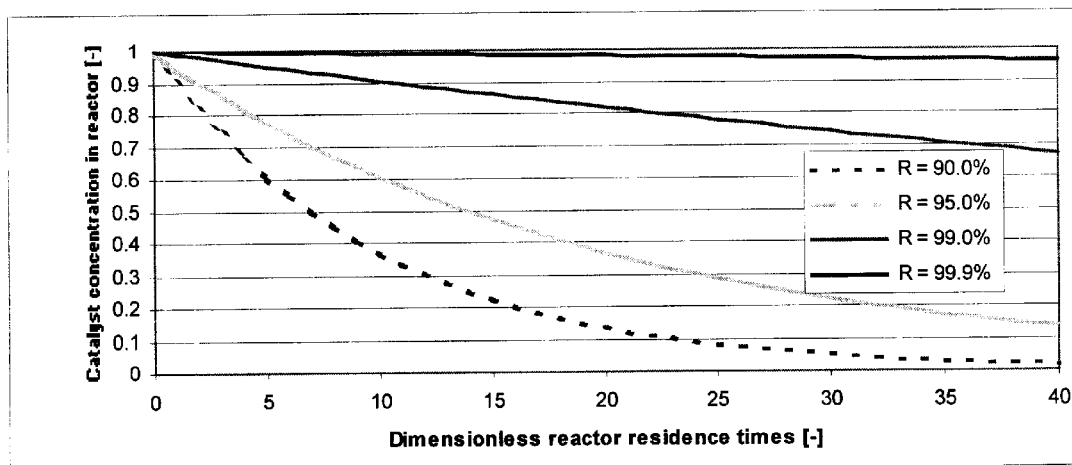
FIG. 1 graphically represents reactor residence times with respect to catalyst concentration in a reactor.

1. Comparison of Specific Filtrate Flows for Inorganic and Polymeric Membranes

The specific filtrate flows were measured for two different solvents (THF and methanol) at flat membranes having a filtration surface area of 26.4 $cm^2$ in a flat membrane reactor. Various flow rates (0.05–0.25 ml/min) were set by means of a pump and the transmembrane pressure drop was determined. The average specific filtrate flow was established from the pressure drop characteristics.

|  | Specific filtrate flow ($l/m^2/h/bar$) | |
| --- | --- | --- |
| Membrane | THF | Methanol |
| Polymeric membrane (nominal cut-off 700 Da) | 4.6 | 5.5 |
| Polymeric membrane (nominal cut-off 10000 Da) | 4.3 | 6.8 |
| Ceramic (flat membrane; $d_{p50}$ < 0.9 nm) | 9.7 | 12.0 |

2. Operating a Continuous CMR Reactor with a Ceramic Membrane

The reactor consists of a crossflow filtration unit (tubular module; nominal separation limit 1000 Da; 25 cm in length) and a reactor volume of 55 ml. The contents of the reactor are continuously circulated through the membrane with the homogeneously dissolved catalysts by means of a circulating pump. An oxazaborolidine ligand bonded to a polystyrene polymer (average molecular weight 38 KDa; dispersity 2.4) is used as catalyst. The reduction of tetralone to tetralol using borane, as is already known in the literature, is performed as the example reaction.

Firstly the catalyst is introduced via a pump into the circulation system filled with THF (final concentration in the reactor: 55 g/l). Any possible impurities are first washed out of the reactor with THF for a period of one hour. The borane solution (0.1 M) and the substrate solution (0.1 M tetralone) are then introduced into the system in equimolar quantities by means of suitable pumps. The residence time is set to 20 min and the average transmembrane pressure to 2 bar. The degrees of conversion, ee values and catalyst losses achieved during a continuous reaction over a period of 7 h are shown below. The conversion and the ee values were determined by means of HPLC. The catalyst concentration in the filtrate was established by means of GPC.

| Time [h] | Conversion [%] | ee values [%] | Catalyst concentration in filtrate {[g/l]} |
| --- | --- | --- | --- |
| 00:00 | n.d. | n.d. | n.d. |
| 2:00 | 100 | 95.9 | <0.001 |
| 3:30 | 100 | 94 | <0.001 |
| 6:00 | 100 | n.d. | <0.001 |

The inorganic membranes described above are superior in terms of pressure stability, flow rate, temperature stability and solvent stability.

What is claimed is:

1. In a process for the catalytic production of an organic compound in which reactants are added to a reaction vessel, a reaction is catalyzed by means of a homogeneously or colloidally soluble catalyst, and product is removed, the improvement comprising:

(a) retaining said catalyst in said reaction vessel during product removal by means of a membrane, wherein said membrane comprises a backing layer of inorganic silicon or metal oxides and an interlayer of inorganic silicon or metal oxides; and (b) removing said product by allowing the liquid in said reaction vessel to crossflow said membrane.

2. The process of claim 1, wherein said interlayer of said membrane is modified with organic groups.

3. The process of claim 1, wherein said interlayer of said membrane has a pore diameter of less than 200 nm.

4. The process of claim 1, wherein said backing layer comprises at least one member selected from the group consisting of: aluminium oxide; and silicon oxide.

5. The process of claim 1, wherein said interlayer comprises at least one member selected from the group consisting of: $TiO_2$; $ZrO_2$; $Al_2O_3$; and $SiO_2$.

6. The process of any one of claims 1–5 wherein said membrane is monotubular, multitubular or in the form of a flat plate.

7. The process of claim 6, wherein said crossflow occurs at a linear speed of 0.01–5 m/s.

8. The process of claim 6, wherein said process is performed in the temperature range of 10–250° C. and at a transmembrane pressure of 150 bar or less.

9. The process of claim 6, wherein said catalyst comprises a member selected from the group consisting of: dendritic, linear or branched homopolymers of butadiene or isoprene; copolymers of butadiene and isoprene; copolymers of at least one of butadiene and isoprene optionally containing propylene or styrene; and block copolymers of at least one of polybutadiene and polyisoprene, optionally containing either polypropylene or polystyrene.

10. The process of claim 6, wherein said catalyst comprises branched or dendritic polymers of at least one member selected from the group consisting of:

polysiloxanes; polyacrylates; polyvinyl pyrrolidones; and polystyrenes.

11. The process of claim 6, wherein said catalyst comprises at least one member selected from the group consisting of: oxazaborolidines; TADDOLs; salens; quinidines; oxazolines; amino alcohols; diols; monophosphenes; diphosphanes; phosphites; phosphonites; and phosphinites.

12. The process of claim 6, wherein said process comprises the production of a non-chiral, racemic or enantiomer-enriched organic compound.

13. The process of claim 6, wherein said membrane has a pore diameter of less than 10nm.

14. The process of claim 6, wherein said membrane has a pore diameter of less than 1nm.

15. The process of claim 6, wherein said crossflow occurs at a linear speed of 0.05–2 m/s.

16. The process of claim 7, wherein said process is performed at a transmembrane pressure of 10 bar or less.

17. The process of claim 7, wherein said process is performed at a transmembrane pressure of 50 bar or less.

* * * * *